United States Patent
Lee et al.

(10) Patent No.: US 7,203,521 B2
(45) Date of Patent: Apr. 10, 2007

(54) METHOD OF DISPLAYING SPEED DIALS ON A SCREEN OF A MOBILE COMMUNICATION TERMINAL

(75) Inventors: Sang Hun Lee, Seoul (KR); Youn Jung, Seoul (KR)

(73) Assignee: Curitel Communications, Inc., Seocho-Gu, Seoul (KR)

( * ) Notice: Subject to any disclaimer, the term of this patent is extended or adjusted under 35 U.S.C. 154(b) by 80 days.

(21) Appl. No.: 11/072,897

(22) Filed: Mar. 4, 2005

(65) Prior Publication Data
US 2005/0197163 A1    Sep. 8, 2005

(30) Foreign Application Priority Data
Mar. 4, 2004    (KR) .................... 10-2004-0014609

(51) Int. Cl.
*H04M 1/00*    (2006.01)
(52) U.S. Cl. .................... 455/564; 455/575.3; 455/566; 455/418; 345/172; 715/780
(58) Field of Classification Search ............. 455/575.3, 455/575.4, 575.1, 564, 565, 566, 415, 418, 455/550.1; 345/168–169, 173, 162, 172, 345/156; 715/780, 864
See application file for complete search history.

(56) References Cited

U.S. PATENT DOCUMENTS

| | | | |
|---|---|---|---|
| 5,790,652 A | | 8/1998 | Gulley et al. ............... 379/368 |
| 5,835,863 A | * | 11/1998 | Ikenouchi et al. ........... 455/566 |
| 6,009,469 A | * | 12/1999 | Mattaway et al. .......... 709/227 |
| 6,125,287 A | | 9/2000 | Cushman et al. ............ 455/566 |
| 6,131,121 A | * | 10/2000 | Mattaway et al. .......... 709/227 |
| 6,781,575 B1 | * | 8/2004 | Hawkins et al. ............. 345/173 |
| 7,007,239 B1 | * | 2/2006 | Hawkins et al. ............. 715/780 |
| 2004/0017376 A1 | * | 1/2004 | Tagliabue et al. ........... 345/581 |
| 2004/0203485 A1 | * | 10/2004 | Lenchik et al. ........... 455/550.1 |
| 2005/0227635 A1 | * | 10/2005 | Hawkins et al. ............. 455/90.3 |
| 2006/0015819 A1 | * | 1/2006 | Hawkins et al. ............. 715/780 |

(Continued)

FOREIGN PATENT DOCUMENTS

KR    1020000040299    7/2000

(Continued)

OTHER PUBLICATIONS

European Search Report dated Jun. 30, 2005.

*Primary Examiner*—George Eng
*Assistant Examiner*—Kamran Afshar
(74) *Attorney, Agent, or Firm*—Ohlandt, Greeley, Ruggiero & Perle, L.L.P.

(57) ABSTRACT

Disclosed is a method of displaying speed dials on a screen of a mobile communication terminal with speed dialing map that may make users of the mobile communication terminal use the speed dials more efficiently.

The method comprises: setting speed dialing information and speed dialing map information, and storing the speed dialing information and the speed dialing map information in memory unit of the mobile communication terminal; reading the speed dialing information and the speed dialing map information from the memory unit of the mobile communication terminal when opening of flip or folder of the mobile communication terminal is sensed; and configuring an speed dialing map in form of number keypads with the speed dialing information and the speed dialing map information, and displaying the speed dialing map.

8 Claims, 3 Drawing Sheets

U.S. PATENT DOCUMENTS

2006/0033706 A1* 2/2006 Haitani et al. ............... 345/156
2006/0084478 A1* 4/2006 Erlichmen .................. 455/566
2006/0161858 A1* 7/2006 Hawkins et al. ............ 715/780
2006/0168539 A1* 7/2006 Hawkins et al. ............ 715/780
2006/0205432 A1* 9/2006 Hawkins et al. ......... 455/552.1

FOREIGN PATENT DOCUMENTS

KR          1020020084784          11/2002

* cited by examiner

METHOD OF DISPLAYING SPEED DIALS ON A SCREEN OF A MOBILE COMMUNICATION TERMINAL

CROSS-REFERENCE TO RELATED APPLICATION

The present application is claiming priority of Korean Patent Application No. 10-2004-0014609, filed on Mar. 4, 2004, the content of which is incorporated herein by reference.

BACKGROUND OF THE INVENTION

1. Field of the Invention

The present invention relates to a method of displaying speed dials on a screen of a mobile communication terminal. More particularly, the present invention relates to a method of displaying speed dials on a screen of a mobile communication terminal with speed dialing map that may make users of the mobile communication terminal use the speed dials more efficiently.

2. Description of the Related Art

Generally, an speed dialing function means a function capable of calling other party with small number of dialing operations in a mobile communication terminal and a telephone, etc. According to the speed dialing function, speed dials can be registered or changed by a user's manipulation.

However, in order to use the speed dials previously set by a user, the user should remember information related to the speed dials ("speed dialing information"). This causes problem of inconvenience in use.

On the other hand, the speed dialing information can be displayed on an initial screen of the mobile communication terminal. However, since the speed dialing information is simply displayed without any special arrangement for efficient use of speed dials, it also has problem of inconvenience in use.

Further, the related art has not provided a means for allowing a user to directly determine whether to display the speed dialing information on the initial screen of the mobile communication terminal. Accordingly, there are problems in that the initial screen becomes complicated and privacy of user is damaged.

BRIEF SUMMARY OF THE INVENTION

Accordingly, the present invention has been made to solve the above-mentioned problems occurring in the related art. The object of the present invention is to provide a method of displaying speed dials on a screen of a mobile communication terminal with speed dialing map that may make users of the mobile communication terminal use the speed dials more efficiently.

More specifically, the object of the present invention is to maximize an inherent effectiveness of the speed dials by arranging speed dialing information corresponding to preset speed dials on a screen of a mobile communication terminal to enable user of the mobile communication terminal to easily recognize the speed dialing information.

The other object of the present invention is to easily search a desirable speed dial when setting up call, by providing speed dialing information, which is difficult to memorize, every call setup to easily check the speed dialing information.

Further, the other object of the present invention is to solve the complexity of an initial screen and to remove weak factors in security of privacy by allowing a user to determine whether to display speed dialing information on the initial screen of a mobile communication terminal.

In order to achieve at least the above objects, in whole or in parts, there is provided a method of displaying speed dials on a screen of a mobile communication terminal comprising: setting speed dialing information and speed dialing map information, and storing the speed dialing information and the speed dialing map information in memory unit of the mobile communication terminal; reading the speed dialing information and the speed dialing map information from the memory unit of the mobile communication terminal when opening of flip or folder of the mobile communication terminal is sensed; and configuring an speed dialing map in form of number keypads with the speed dialing information and the speed dialing map information, and displaying the speed dialing map.

Preferably, priority in displaying the speed dialing information may be set during the act of setting the speed dialing information and the speed dialing map information, and the speed dialing information comprises at least one of images, names and telephone numbers corresponding to each speed dial.

Preferably, the method further comprises: adding setting option in main menu of the mobile communication terminal, the setting option enabling user to select whether to display the speed dialing map on initial screen of the mobile communication terminal.

Preferably, the speed dialing map may display speed dials and speed dialing information having No. 1 priority among speed dialing information corresponding to the speed dials.

Preferably, the method further comprises setting a screen conversion function for converting initial screen of the mobile communication terminal, and converting a screen displaying the speed dialing map into general initial screen.

In order to achieve at least the above objects, in whole or in parts, there is provided a method of displaying speed dials on a screen of a mobile communication terminal comprising: setting speed dialing information and speed dialing map information, and storing the speed dialing information and the speed dialing map information in memory unit of the mobile communication terminal; adding setting option in main menu of the mobile communication terminal, the setting option enabling user to select whether to display an speed dialing map on initial screen of the mobile communication terminal; reading the setting option when opening of flip or folder of the mobile communication terminal is sensed; reading the speed dialing information and the speed dialing map information from the memory unit of the mobile communication terminal when display of the speed dialing map is selected; and configuring the speed dialing map in form of number keypads with the speed dialing information and the speed dialing map information, and displaying the speed dialing map.

Preferably, priority in displaying the speed dialing information may be set during the act of setting the speed dialing information and the speed dialing map information, and the speed dialing information comprises at least one of images, names and telephone numbers corresponding to each speed dial.

Preferably, the speed dialing map may display speed dials and speed dialing information having No. 1 priority among speed dialing information corresponding to the speed dials.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
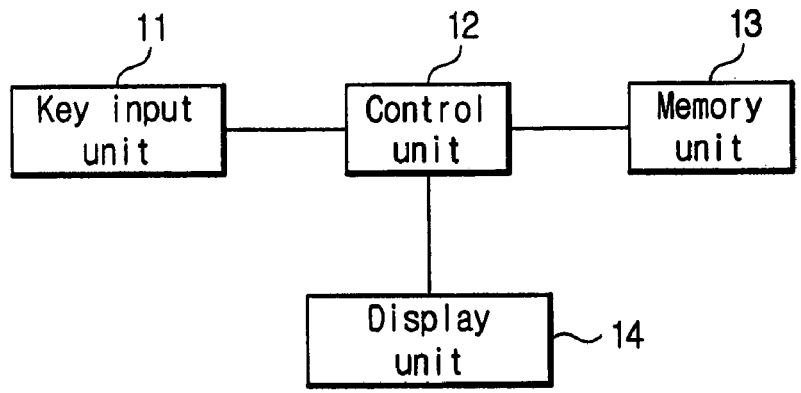
FIG. 1 is a block diagram illustrating a configuration for displaying speed dials on a screen of a mobile communication terminal according to an embodiment of the present invention.

As illustrated in FIG. 1, a configuration for displaying speed dials on a screen of a mobile communication terminal according to an embodiment of the present invention comprises a key input unit 11, a control unit 12, a memory unit 13 and a display unit 14.

The key input unit 11 receives a request of conversion between an speed dialing map and an initial screen through a screen conversion function button from a user and applies the request to the control unit 12.

The memory unit 13 stores programs and data required for controlling operations of the control unit 12. In particular, the memory unit 13 stores 1) speed dialing information such as speed dials, personal names corresponding to the speed dials, telephone numbers corresponding to the speed dials and images (including multimedia information such as melody, animation and moving picture, etc.) corresponding to the speed dials, 2) speed dialing map information about an speed dialing map in form of number keypads, 3) information about a setting option capable of selecting whether to display the speed dialing map, and 4) information about whether there is the request of screen conversion or not.

When an opening of a flip or folder of the mobile communication terminal is sensed, the control unit 12 reads the speed dialing information and the speed dialing map information from the memory unit 13, thereby configuring speed dialing map with the speed dialing information and the speed dialing map information. Further, the control unit 12 controls the display unit 14 to display the speed dialing map, reads the setting option from the memory unit 13 for controlling the display unit 14 to display the general initial screen or the speed dialing map when the flip or folder is opened, and checks the request of screen conversion inputted through the screen conversion function button of the key input unit 11 for controlling the display unit 14 to convert the screen.

The display unit 14 displays the general initial screen or the speed dialing map of the mobile communication terminal according to controls of the control unit 12. The display unit 14 also displays a screen that helps user select whether to display the speed dialing map.

Hereinafter, a method of displaying speed dials on a screen of a mobile communication terminal will be described with reference to a flow chart illustrated in FIG. 2.

First, speed dialing information and speed dialing map information are set and stored in the memory unit 13 of the mobile communication terminal (S21). At this time, speed dialing information corresponding to speed dials such as personal names, telephone numbers, images (including multimedia information such as melody, animation and moving picture, etc.) is stored in the memory unit 13 along with the speed dials. Further, speed dialing map information for arranging the speed dialing information in form of number keypads on initial screen of the mobile communication terminal is set and stored in the memory unit 13. In addition, priority among the speed dialing information is set and stored. For example, the priority can be decided like order of the images, personal names and telephone numbers.

When a user opens a flip or folder of the mobile communication terminal, the control unit 11 senses the opening of the flip or folder (S22). Then, the control unit 11 reads the speed dialing information and the speed dialing map information stored in the memory unit 13 (S23), and configures an speed dialing map in form of number keypads with the speed dialing information and the speed dialing map information (S24). The speed dialing map is configured for displaying various speed dialing information in order of the previously set priority. In other words, if priority is set up in order of images, personal names and telephone numbers, and both image and personal name corresponding to an speed dial are stored, the image will be displayed for the speed dial, thereby allowing the user of the mobile communication terminal to easily recognize the speed dial with the image.

After that, the display unit 14 displays the speed dialing map in form of number keypads under a status icon bar of the screen displaying a status of the mobile communication terminal, according to controls of the control unit 12 (S25), so that it is possible for the user to perform call setup by easily recognizing and pressing a desirable speed dial.

Figure 3:
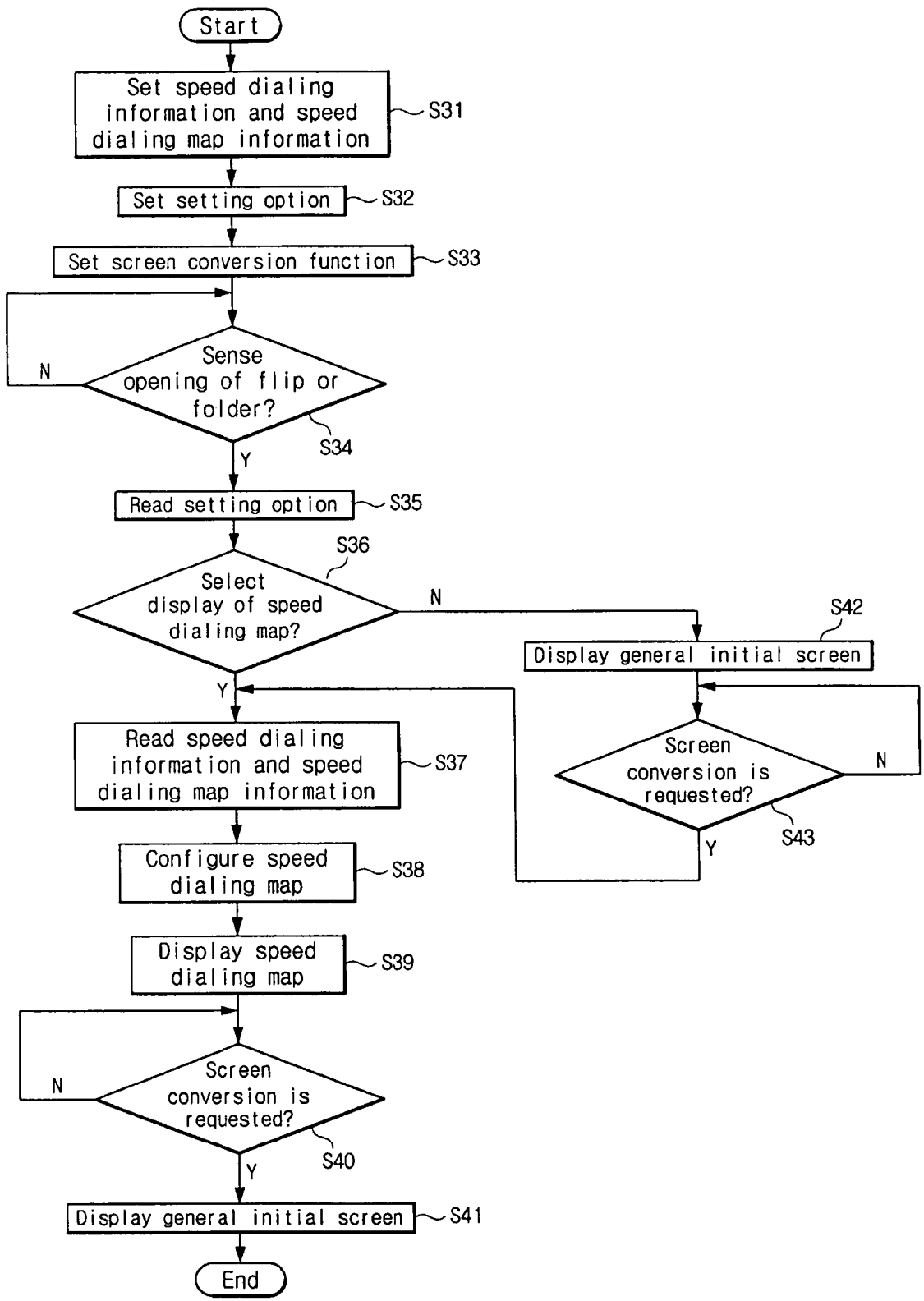
FIG. 3 is a flow chart illustrating a method of displaying speed dials on a screen of a mobile communication terminal according to another embodiment of the present invention.

Hereinafter, a method of displaying speed dials on a screen of a mobile communication terminal according to another embodiment of the invention will be described with reference to a flow chart illustrated in FIG. 3.

Figure 2:
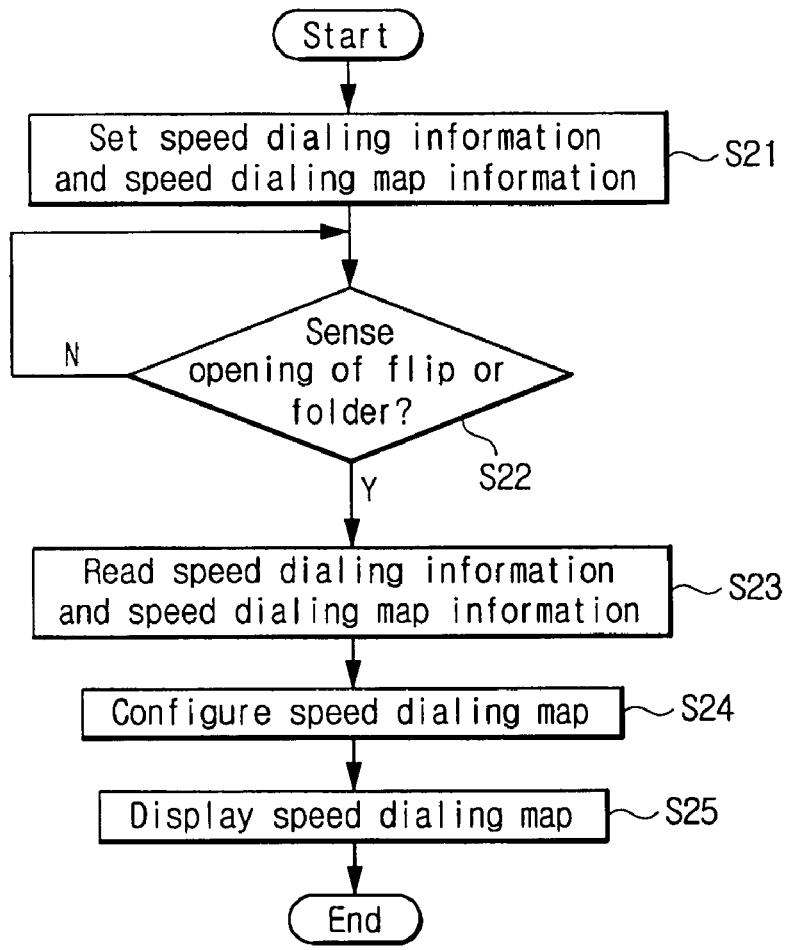
FIG. 2 is a flow chart illustrating a method of displaying speed dials on a screen of a mobile communication terminal according to an embodiment of the present invention.

First, as with S21 in FIG. 2, speed dialing information and speed dialing map information are set and stored in the memory unit 13 of the mobile communication terminal (S31). A menu (i.e., setting option) enabling user to select whether to display the speed dialing map on the initial screen of the mobile communication terminal or not is separately set to a main menu stored in the memory unit 13 (S32). A screen conversion function for conversion between the general initial screen and the speed dialing map is set and stored in the memory unit 13 (S33).

When a user opens a flip or folder of the mobile communication terminal, the control unit 11 senses the opening of the flip or folder (S34) and reads the setting option stored in the memory unit 13 (S35).

At this time, the control unit 12 checks whether the user selects display of the speed dialing map when flip or folder is opened (S36). If the user selects display of the speed dialing map in S36, the control unit 12 performs same operations from the S23 to S25 illustrated in FIG. 2 and displays the speed dialing map (S37, S38 and S39).

After that, when screen conversion is requested from the user through a screen conversion function button of the key input unit 11, the control unit 12 checks the request of screen conversion (S40) and controls the display unit 14 to display the general initial screen instead of the speed dialing map (S41).

On the other hand, if display of the general initial screen is selected in S36, the control unit 12 controls the display unit 14 to display the general initial screen (S42).

When a screen conversion is requested through the screen conversion function button of the key input unit 11 for converting the general initial screen into the speed dialing map screen (S43), the control unit 12 performs operations from S37 to S39 and displays the speed dialing map.

Figure 4:
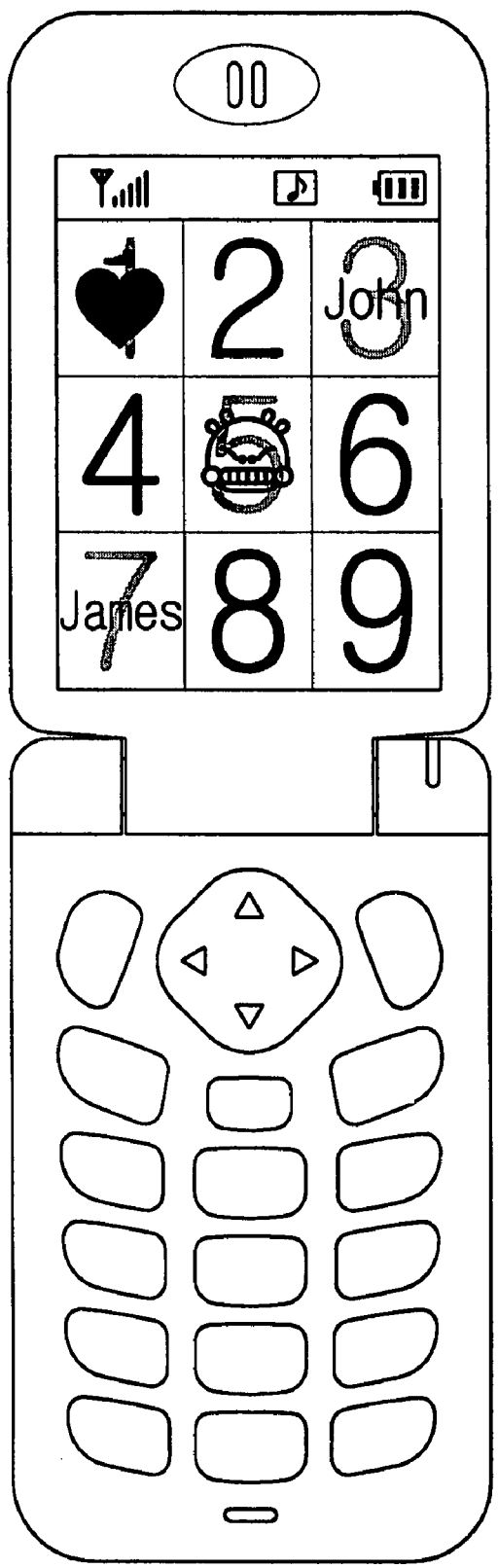
FIG. 4 illustrates an example of speed dialing map which can be used for the method illustrated in FIG. 2 or FIG. 3.

FIG. 4 illustrates an speed dialing map according to an embodiment of the present invention.

The speed dialing map is divided into 9 sections and displays images, names, and numbers, etc. The numbers displayed in each of the sections mean speed dials. The section in which the number only is displayed means that there is no name and telephone number stored corresponding to the speed dial.

Hereinafter, more detailed descriptions will be provided with reference to table 1.

TABLE 1

| Abbreviated dials | Image | Name | Telephone number |
| --- | --- | --- | --- |
| 1 | Heart | Cindy | 010-222-1234 |
| 2 | — | — | — |
| 3 | — | John | 010-524-7528 |
| 4 | — | — | — |
| 5 | Angry face | Boss | 02-724-8542 |
| 6 | — | — | — |
| 7 | — | James | 010-852-7946 |
| 8 | — | — | — |
| 9 | — | — | — |

The table 1 is a list of speed dialing information stored in the memory unit. The table 1 and FIG. 4 illustrate that, in the cases of displaying a name (cases of speed dials 3 and 7), a name and a telephone number are stored in the memory unit, and in the cases of displaying an image (cases of speed dials 1 and 5), an image, a name and a telephone number are stored. The information displayed on the speed dialing map is determined b priority set among the speed dialing information as described above. In other words, since a priority is set in order of an image, a personal name and a telephone number in the table 1 and FIG. 4, when all of the image, name and telephone number are stored (speed dials 1 and 5), the image is displayed. The priority may be differently decided according to the user's preference.

Like above, according to the present invention, it is possible for user of the mobile communication terminal to conveniently use the speed dialing map because the speed dialing map displays not only personal names but also images previously set corresponding to the names and telephone numbers when configuring the speed dialing map. The images comprise images downloaded through internet, images photographed by digital camera provided in the mobile communication terminal and images photographed by digital camera, regardless of types such as moving pictures and still pictures.

In addition, the number of the speed dials displayed by the speed dialing map is not limited to 9 like FIG. 4 and may be embodied diversely. Additionally, it can be embodied that more speed dialing information may be seen in addition to the speed dialing information contained in the speed dialing map initially displayed, by pushing a specific button of the key input unit of the mobile communication terminal.

As described above, according to the present invention, speed dialing map is selectively displayed in form of number keypads on an initial screen of a mobile communication terminal. Accordingly, a user can easily recognize desired information and perform a call setup, so that the user can easily and quickly find a desirable speed dial and easily convert the screen into a general initial screen when the user wants.

While the present invention has been shown and described with reference to certain preferred embodiments thereof, it will be understood by those skilled in the art that various changes in form and details may be made therein without departing from the spirit and scope of the invention as defined by the appended claims, and the present invention can be applied to all communication devices having a proper size of displaying means such as a telephone.

What is claimed is:

1. A method of displaying speed dial numbers on a screen of a mobile communication terminal comprising:

setting speed dialing information and speed dialing map information, and storing the speed dialing information and the speed dialing map information in memory unit of the mobile communication terminal;

reading the speed dialing information and the speed dialing map information from the memory unit of the mobile communication terminal when opening of flip or folder of the mobile communication terminal is sensed;

configuring an speed dialing map in form of number keypads with the speed dialing information and the speed dialing map information; and displaying the speed dialing map in form of number keypads, in which each speed dial number is overlapped with speed dialing information corresponding to each speed dial number.

2. The method of claim 1, wherein priority in displaying the speed dialing information is set during the act of setting the speed dialing information and the speed dialing map information, and wherein the speed dialing information comprises at least one of images, names and telephone numbers corresponding to each speed dial.

3. The method of claim 1, further comprising: adding setting option in main menu of the mobile communication terminal, the setting option enabling user to select whether to display the speed dialing map on initial screen of the mobile communication terminal.

4. The method of claim 2, wherein the speed dialing map displays speed dials and speed dialing information having number one priority among speed dialing information corresponding to the speed dials.

5. The method of claim 1, further comprising: setting a screen conversion function for converting initial screen of the mobile communication terminal, and converting a screen displaying the speed dialing map into general initial screen.

6. A method of displaying speed dial numbers on a screen of a mobile communication terminal comprising:

setting speed dialing information and speed dialing map information, and storing the speed dialing information and the speed dialing map information in memory unit of the mobile communication terminal;

adding setting option in main menu of the mobile communication terminal, the setting option enabling user to select whether to display the speed dial numbers on initial screen of the mobile communication terminal;

reading the setting option when opening of flip or folder of the mobile communication terminal is sensed;

reading the speed dialing information and the speed dialing map information from the memory unit of the mobile communication terminal when display of the speed dialing map is selected;

configuring the speed dialing map in form of number keypads with the speed dialing information and the speed dialing map information; and displaying the speed dialing map in form of number keypads, in which each speed dial number is overlapped with speed dialing information corresponding to each speed dial number.

7. The method of claim 6, wherein priority in displaying the speed dialing information is set during the act of setting the speed dialing information and the speed dialing map information, and wherein the speed dialing information comprises at least one of images, names and telephone numbers corresponding to each speed dial.

8. The method of claim 7, wherein the speed dialing map displays speed dials and speed dialing information having number one priority among speed dialing information corresponding to the speed dials.

* * * * *